United States Patent [19]
Meyer

[11] Patent Number: 6,088,541
[45] Date of Patent: Jul. 11, 2000

[54] COLOR-BALANCED GLARE REDUCTION SYSTEM FOR FLASH CAMERAS

[75] Inventor: Robert B. Meyer, Wellesley, Mass.

[73] Assignee: Brandeis University, Waltham, Mass.

[21] Appl. No.: 09/193,743

[22] Filed: Nov. 17, 1998

Related U.S. Application Data

[60] Provisional application No. 60/066,240, Nov. 20, 1997.

[51] Int. Cl.[7] .................................................. G03B 15/03
[52] U.S. Cl. .............................................................. 396/155
[58] Field of Search ............................................... 396/155

[56] References Cited

U.S. PATENT DOCUMENTS

3,709,119   1/1973   Van Der Meer ........................ 95/11 R
3,762,298  10/1973   Johnson ................................... 396/155

*Primary Examiner*—W. B. Perkey
*Attorney, Agent, or Firm*—Brobeck, Phleger & Harrison

[57] ABSTRACT

A flash camera with glare controlling ability for general photographic use is described. It includes at least two panchromatic reflective sheet polarizing filters. One filter is incorporated in the flash unit to produce a polarized light flash source. The flash source also incorporates light redirecting means such that a majority of light from the flash is directed toward the photographic scene. A second filter over the camera lens excludes that light originating from the flash source which is specularly reflected from the photographic scene.

19 Claims, 3 Drawing Sheets

COLOR-BALANCED GLARE REDUCTION SYSTEM FOR FLASH CAMERAS

RELATED APPLICATIONS

This application claims the benefit of U.S. Provisional Application Ser. No. 60/066,240, filed Nov. 20, 1997, entitled COLOR-BALANCED GLARE REDUCTION SYSTEM FOR FLASH CAMERAS, inventor Robert B. Meyer, which is hereby incorporated by reference in its entirety, including drawings.

BACKGROUND OF THE INVENTION

This invention relates to the reduction of glare, or unwanted specularly reflected light, in flash photography. Because flash photography uses a small, very bright, light source, rather than the diffuse light of ordinary ambient illumination, and moreover, because in self-contained flash cameras this source of light shines directly, or face-on to the illuminated scene, there are often unwanted bright reflections or highlights in the resulting photograph. These include specular reflections off of glass, metal surfaces, and the shiny surface of skin, often on the faces of the subjects of the photograph.

Van Der Meer in U.S. Pat. No. 3,709,119 describes a close-up (e.g., 13–17 inches) photographic system utilizing a flash unit for illumination, and light polarizing means for reducing reflected glare. The polarizers used in the system are absorptive sheet polarizers of the type manufactured by Polaroid Corporation (Cambridge, Mass.) that function by absorbing very effectively one linear polarization of light and transmitting a portion of the second linear polarization of light from an unpolarized light source. The light transmitted by such absorptive polarizing filters can be highly polarized, but only about 30% to 40% of the initially unpolarized light is transmitted.

Grinberg et al. in U.S. Pat. No. 4,073,571, and Barnik et al. in U.S. Pat. No. 5,295,009 describe light sources incorporating reflective sheet circular polarizers, based on cholesteric liquid crystal materials. Such reflective sheet circular polarizers are currently being developed for commercial use in the polarized backlight illumination of the liquid crystal display panels in portable computers. The 3M company (St. Paul, Minn.) manufactures reflective sheet linear polarizers based on multilayer polymer materials, under the product name Dual Brightness Enhancement Film (DBEF). These polarizers are currently used in the polarized backlight illumination of liquid crystal displays in portable computers.

The information described above is not admitted to be prior art to the present invention, but is provided only to assist the understanding of the reader.

SUMMARY OF THE INVENTION

The present invention concerns a system to reduce glare in flash photography, while maintaining color balance. It incorporates the use of recently developed reflective sheet polarizers to achieve a high efficiency in the utilization of the light available from the flash lamp within the flash unit, by light recycling. Coupled to this use of reflective sheet polarizers are means for redirecting the light reflected from the sheet polarizer (the recycled light) within the flash unit, in a forward direction for improved illumination of the photographic scene as compared to the use of absorptive polarizers. By the use of the light recycling capability of reflective polarizers incorporated into the flash unit, in combination with means for redirecting the recycled light, one can achieve a brightness of illumination of the photographic scene by the flash unit approaching the brightness of illumination by a flash unit of the same energy per flash but without the polarizing filter. Moreover, by using the reflective sheet polarizer over the lens of the camera, one can again increase the transmission of light through the lens, compared to that achieved with an absorptive polarizer. Finally, surprisingly, the color fidelity of pictures taken with the reflective polarizers is better than that of pictures taken with absorptive polarizers.

Thus, in a first aspect, the invention provides a flash camera with glare controlling ability suitable for general photographic use. It includes at least two reflective polarizing filters. One filter is incorporated in the flash unit to produce a polarized light flash source. The flash source also incorporates light redirecting means such that a majority of light from the flash is directed toward the photographic scene. A second filter over the camera lens excludes that light originating from the flash source which is specularly reflected from the photographic scene. Preferably the polarizing filters are panchromatic filters, thereby maintaining appropriate color balance in the photograph, and preferably are in sheet form. Therefore, it is highly preferable that the filters are panchromatic reflective sheet polarizing filters. The flash unit can be built into the body of the camera, attached to the body of the camera, or separate from the camera body.

A polarizing filter, or polarizer, is an optical filter that transmits one polarization of light. A linear polarizer transmits one linear polarization while a circular polarizer transmits one circular polarization. An absorptive polarizer absorbs the polarization that is not transmitted, while a reflective polarizer reflects the polarization that is not transmitted. A sheet polarizer is one consisting of a thin layer of material, typically 10 micrometers to 500 micrometers thick, whose molecular structure and organization is such that it accomplishes the purpose of a polarizer. In the case of a reflective polarizer, the internal structure of this thin layer reflects light of one polarization in a specular reflection from the plane of the sheet, while transmitting light of the other polarization without changing its direction. As understood by those skilled in the art, the term panchromatic refers to acting essentially equally on all wavelengths of visible light. In reference to reflective polarizers, panchromatic means that the two polarizations of light are separated essentially equally well for all visible wavelengths, not necessarily that the separation efficiency is identical for all wavelengths over the range of wavelengths of visible light. In connection with the present invention, a panchromatic polarizer separates the two polarizations essentially equally, meaning that the variations in polarization separation at different wavelengths of visible light are not large enough to cause objectionable distortions in the color balance of a photograph after use of the glare reduction system.

The term "general photographic use" refers to use in photographing subjects in the range of approximately 4 feet to 15 feet from the camera. In connection with the glare reduction system of this invention, the system is suitable for general photographic use in the distance range indicated, but is not limited to that range.

In one embodiment of the invention, the light redirecting means in the flash unit includes either a combination of a deeply curved reflector and a curved polarizing filter or a combination of a shallowly curved reflector, flat polarizer, and two prismatically surfaced brightness enhancing films.

A prismatically surfaced brightness enhancing film is a thin layer of transparent material, typically 100 to 200 micrometers thick, typically with linear grooves on one surface. These grooves are triangular in cross section, with the ridges between the grooves resembling long thin prisms. Diffuse light incident upon the film from its flat surface is reflected and refracted by the grooved surface, with the result that the light emerging from the grooved surface is directed more toward the direction perpendicular to the plane of the film than was the diffuse light incident on the film. To achieve this so called brightness enhancement for all directions of light obliquely incident on the film, one typically uses two brightness enhancing films in series, with their grooves oriented at right angles to one another. An example of such a film is the product sold by the 3M corporation under the product name Brightness Enhancing Film II (BEF II), in which the pitch of the grooves is in the range of 24 micrometers to 50 micrometers, and the prism angle of the grooves is 90 or 100 degrees. For the purpose of this invention any such film which accomplishes the brightness enhancement described is suitable and is included within the definition of brightness enhancing film. Therefore, brightness enhancing films are not limited to those having the geometry specified above.

In another embodiment, the polarizing filter over the camera lens can be removed or displaced to allow more ambient light to enter the camera lens when the camera is not being used for flash photography. In a preferred embodiment, the filter over the camera lens can be displaced by sliding or hinging it away from the lens.

In another embodiment, the polarizing filters are panchromatic reflective sheet circular polarizers, both having the same sense of circular polarity.

In yet another embodiment, the polarizing filters are panchromatic reflective sheet linear polarizers, with their polarization axes oriented perpendicular to each other. In a preferred embodiment, a quarter wave optical retarder sheet is placed between the reflective polarizer and the flash lamp in the flash unit of the camera, with its optical axis oriented at approximately 45 degrees angular rotation with respect to the polarization axis of the polarizing filter.

A quarter wave optical retarder is a sheet of birefringent material with its optical axis in the plane of the sheet. The birefringence and thickness of the sheet are chosen so that for light of one wavelength, the optical thickness of the sheet for light propagating normal to the plane of the sheet and polarized parallel to the optical axis differs by one quarter of one wavelength from the optical thickness of the sheet for the same light polarized perpendicular to the optical axis.

In still another embodiment the means for recording the image in the camera is either a film emulsion or a recording electronic imaging device, such as is found in a digital recording camera. The term "film emulsion" refers to the photochemically sensitive layer as used, for example, on conventional photographic film.

In a second aspect of the invention, a method is described for reducing glare in camera-recorded images in which light from the flash unit of a camera is specularly reflected from a photographic scene. The method includes providing at least two panchromatic reflective sheet polarizing filters, and structuring the camera with a first polarizer as a component within the flash unit of the camera to create a polarized light flash source such that a majority of the light from the flash unit is directed toward the photographic scene. A second reflective sheet polarizer is placed over the camera lens and an image is recorded with this camera during flash illumination of a photographic scene.

In one embodiment, the flash unit includes a combination of a deeply curved reflector and a curved reflective polarizing filter, or a combination of a shallowly curved reflector, a flat reflective polarizer, and two prismatically surfaced brightness enhancing films.

In another embodiment, the polarizing filters are panchromatic reflective sheet circular polarizers having the same sense of circular polarization.

In a still another embodiment, the polarizing filters are panchromatic reflective sheet linear polarizing filters with their polarization axes oriented perpendicular to one another. In a preferred embodiment, a quarter wave optical retarder sheet is placed beneath the reflective linear polarizer in the flash unit of the camera with its optical axis oriented at approximately 45 degrees angular rotation with respect to the polarization axis of the polarizing filter.

As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

Other embodiments will be apparent from the description of the preferred embodiments and from the claims.

BRIEF DESCRIPTION OF THE DRAWINGS

FIG. 2 shows an example of a flash unit design which effectively recycles light reflected by a reflective polarizer and directs the majority of the light generated by the light source toward the scene to be photographed.

DETAILED DESCRIPTION OF THE PREFERRED EMBODIMENTS

The glare problem in flash ph oto graphy arises from the use of a small very bright source of light, the flash, to illuminate a scene. Shiny objects in the scene which specularly reflect light produce images of the flash which appear as highlights and very bright regions in the image within the camera. The brightness of these undesired bright regions often exceeds the capacity of the recording medium in the camera, e.g., film or a recording electronic imaging device such as that found in a digital recording camera. This phenomenon results in obliteration of certain portions of the photographic scene in the image, or at least creation of artificial elements in the image. If the photographic scene had been illuminated by a diffuse light source, such as daylight or indirect lighting in a room, such artifacts would be absent. The present invention blocks light originating from the flash and specularly reflected from the photographic scene from entering the camera lens by the use of polarizing filters which transmit light of only one polarization.

Glare reduction for flash photography is rendered possible by the use of a polarized light flash unit and a polarizing optical filter over the camera lens to eliminate the unwanted specular reflections, while admitting to the camera lens the desirable diffusely reflected light from the flash. The present invention makes use of recently developed panchromatic reflective sheet polarizing filters which are highly efficient in the use of optical power. These new filters allow the design and assembly of polarized light sources that do not waste optical power in absorption, but recycle reflected light, so that most of the light generated within the light source leaves the light source as polarized light of the desired polarization. In addition, these new filters maintain unexpectedly good color balance in the light they transmit, compared to absorptive polarizers which distort color in the light they transmit, so that the new polarizers are especially well suited to color photography.

The glare reduction system depends on the polarization properties of reflected light. When polarized light is specularly reflected back toward its source from mirror-like surfaces such as metal or glass, or from the shiny surfaces of any material, including human skin, the reflected light is also polarized. Linearly polarized light remains linearly polarized after specular reflection, with the same direction of polarization as the incident light polarization. On the other hand, circularly polarized light, upon reflection, changes its sense of circular polarization. In either case, the appropriate polarizing filter over the lens of the camera can block the specularly reflected polarized light from entering the camera lens. In contrast, diffusely reflected light (meaning light that undergoes several local reflections in a material before it emerges and travels back toward its source) loses, to a substantial degree, any polarization that it had, and is said to be depolarized. When this depolarized light strikes the polarizer over the lens of the camera, about half of it is transmitted and enters the camera lens. The image created in the camera by the depolarized light lacks the strong highlights that are typical of specularly reflected light from the flash unit, and resembles an image made with diffuse illumination of the photographic scene by daylight or indirect light from several sources. Thus, in spite of the use of a small bright flash source, by using the glare reduction polarizing filters of the present invention, one can obtain a photograph similar in quality to that obtained with diffuse illumination. Such a photograph is pleasing because it closely resembles images one normally sees with one's eyes.

Figure 3:
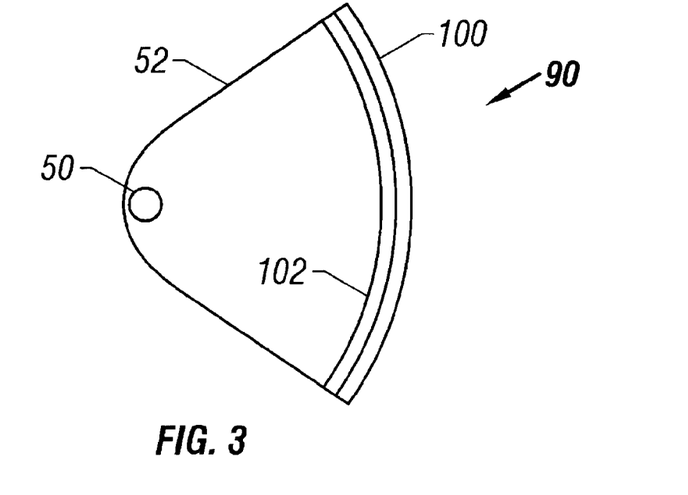
FIG. 3 shows an example of a flash unit which effectively recycles light reflected by reflective polarizer and directs the majority of the light generated by the light source toward the scene to be photographed. The flash unit has a deeply curved reflector, and a curved combination of a reflective linear polarizer and a quarter wave plate.
Figure 4:
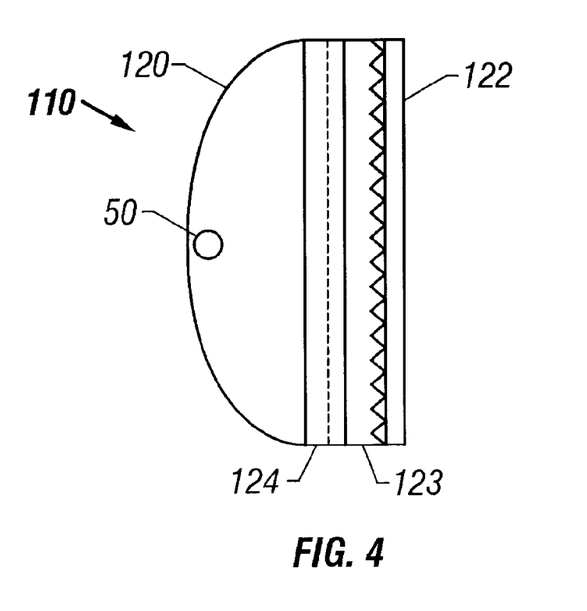
FIG. 4 shows an example of a flash unit which effectively recycles light reflected by a reflective polarizer and directs the majority of the light generated by the light source toward the scene to be photographed. The flash unit has a shallowly curved reflector, a flat reflective polarizer, and two prismatically surfaced brightness enhancing films.

The present invention is partially based upon the improved efficiency of utilization of light from the flash unit of a camera in polarized light illumination of a photographic scene. This efficiency is achieved by the use of a reflective sheet polarizer in the flash unit. In contrast to the prior art use of absorptive polarizers, it is therefore important to describe, in detail, the recycling of light with reflective polarizers. The objective is to direct both the light that is initially transmitted through the polarizer, and the light that is reflected back into the flash unit by the polarizer (the recycled light), toward the photographic scene. Several examples of designs of flash units that achieve this objective are shown in FIG. 2, FIG. 3 and FIG. 4 and are described in the Examples below. These examples are shown only to illustrate several means for achieving the objectives of the present invention. Other designs will be evident to those skilled in the art.

The recycling of light means that the light reflected by the reflective polarizer back into the flash unit is converted to light of the correct polarization to be transmitted by the polarizer. In the case of a reflective circular polarizer, this conversion can be accomplished by a single specular reflection off of a reflector in the flash unit. For a reflective linear polarizer, it can be accomplished by passing twice through a quarter wave retarder plate located just inside the reflective polarizer. For either kind of reflective polarizer, this conversion can also be accomplished by diffuse reflections in the flash unit, in which the recycled light is partially or fully depolarized, so that part of the recycled light incident again on the polarizer is transmitted, while part is again recycled. For reflective circular polarizers based on cholesteric liquid crystal materials, light recycling using diffuse reflections has been demonstrated to increase light output from polarized light sources by as much as 80%; corresponding increases for linear reflective polarizers (DBEF films from 3M Company) are reported at 60%. In flash units designed to optimize the recycling of light, one can reasonably expect from 75% to 95% of the light generated in the flash unit to leave the flash unit as polarized light.

In contrast, glare reduction methods utilizing absorptive sheet polarizers are limited in application due to the inefficient use of light. Thus, such absorptive sheet polarizers are not practical for general flash photography, but are only practical for close-up flash photography. For example, an absorptive sheet polarizer will generally transmit only about 30–40% of the incident unpolarized light. Therefore, with one such polarizer over the flash source and another over the lens of the camera, the diffusely reflected light from the illuminated scene reaching the camera lens is reduced to between 10 and 20 percent of what it would be without the polarizing filters. This use of polarizing filters effectively reduces reflected glare, but at an enormous cost in light intensity, and with substantial loss of color balance. For color photography, such a system would also require use of a color correction filter in addition to the polarizers to obtain acceptable color balance. This would result in further loss of light. The overall loss of light intensity may generally limit this approach to a close-up photographic system, in which the intensity of the flash source is adequate for illuminating subjects very close to the flash unit and the camera lens (e.g., about 13 inches to 17 inches). The improvement in the efficiency of light utilization in the glare reduction system of this invention over previously described systems is of a magnitude sufficient to make this system practical and cost effective as a glare reduction system for general flash photography, including for flash photography with small, self-contained, battery-powered cameras.

To evaluate the use of polarizing filters for glare reduction, a series of tests was carried out in which polarizing filters were placed over the flash unit and the lens of a small flash camera (a Kodak FunSaver EZ Flash with Kodak Gold ASA 400 color film), and pictures were taken of a photographic scene approximately 4 feet from the camera. The photographic scene included a sheet of window glass directly in front of the camera next to the face of a person wearing glasses, with a reflective aluminum foil ornament on his shirt. Different kinds of polarizing filters were used in a series of photographs. First, without polarizing filters, the resulting photographs were well illuminated, with good contrast and color balance, and with significant amounts of glare. Absorptive polarizers, type HNCP37 from the Polaroid Corporation (Cambridge, Mass.), produced photographs in which there was significant glare reduction, but a low level of illumination and distortion of colors toward the blue-green, with exaggeratedly brown skin tones. Reflective linear polarizers, type DBEF, from the 3M Corporation produced significant glare reduction, only slightly brighter illumination than the absorptive polarizers, and a somewhat low contrast image, with some color distortions toward the blue-green. Reflective circular polarizers, research samples number J.L. 1#8-23-97 and J.L.2#8-24-97 from Reveo Corporation (Hawthorn, N.Y.), produced significant glare reduction, slightly brighter illumination than the absorptive polarizers, excellent contrast and natural color balance. The natural color balance is believed to be due to the panchromatic nature of the reflective circular polarizers from Reveo Corporation, meaning that they separate circular polarizations of light to a uniform degree for all visible wavelengths of light. The absorptive polarizers from Polaroid Corporation had significant chromatic variations in their light transmission, and the reflective polarizers from 3M Corporation had significant chromatic variations in separation of polarizations, with leakage of the undesired polarization in parts of the green to violet region of the spectrum. The overall visual effect was that the reflective circular polarizers gave the best quality photographs, better than the photographs without polarizing filters in terms of glare and overall appearance, but still with lower brightness of illumination than was desired.

From these tests, it was realized that simply placing a flat reflective polarizing filter over the flash unit of the camera was not sufficiently increasing the illumination of the photographic scene, compared to the use of absorptive polarizers. That is, the light reflected from the polarizer was not being adequately redirected forward toward the photographic scene; i.e., it was not being effectively recycled. It was found that placing the polarizer properly with respect to the other optical elements in the flash unit allowed one to take advantage of the unique properties of a reflective polarizer and obtain a bright polarized flash light source, so that light reflected by the polarizer is redirected toward the photographic scene, and thus effectively recycled. This can be accomplished in several ways. First, by understanding the design and geometry of an existing flash unit, one can place the reflective polarizer properly, and curve it if necessary, so that light is effectively recycled. Or, one can redesign the entire flash unit so that the flash lamp, reflector, other optical elements, and the reflective polarizer all work together to direct a majority of the light, including the recycled light, toward the photographic scene. Examples of both approaches are described below.

Figure 1:
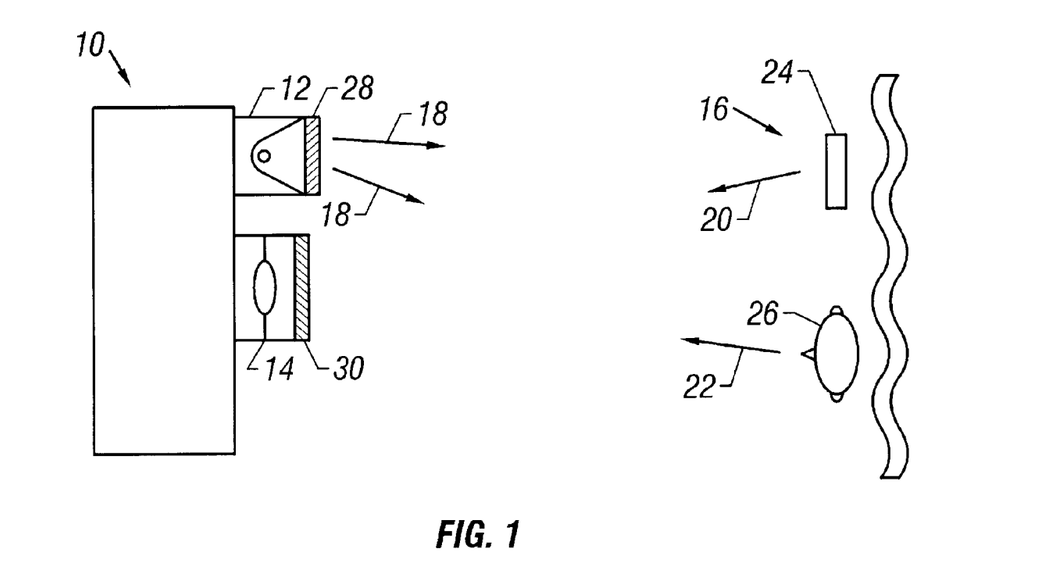
FIG. 1 is a diagrammatic depiction of a camera and a photographic scene indicating the main components of the camera and the polarizing filters that comprise the glare reduction system, with indication of light rays and different elements in the photographic scene to facilitate description of the function of the glare reduction system.

The overall glare reduction system is described with reference to FIG. 1. FIG. 1 shows a typical camera 10 with flash unit 12, lens 14, and photographic scene 16, illuminated by rays of light 18 from the flash unit. Also shown in FIG. 1 are rays of light 20 and 22 reflected from objects in the scene, including specularly reflected (polarized) rays 20 from shiny objects 24, and diffusely reflected (depolarized) rays 22 from diffusely reflective objects 26. Incorporated into the flash unit of the camera is a reflective sheet polarizer 28, arranged so that all light from the flash unit illuminating the photographic scene is polarized. Over the lens of the camera is a second sheet polarizer 30 which blocks specularly reflected (polarized) rays 20 from entering the lens 14, while allowing approximately half the light in the diffusely reflected (depolarized) rays 22 to enter the camera lens.

EXAMPLE 1

In this example, the light recycling in the flash unit is accomplished with the use of a reflective sheet circular polarizer, and glare reduction is achieved with a matching circular polarizer over the camera lens.

Figure 2A:
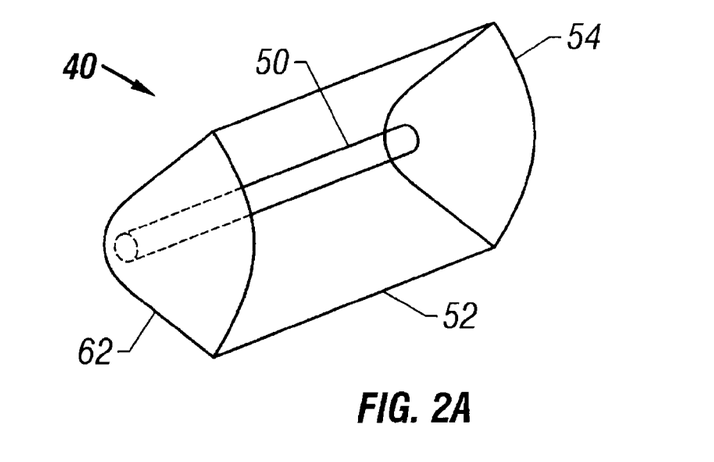
FIG. 2A is a schematic diagram of a flash unit with a deeply curved reflector and a curved circular reflective polarizer.
Figure 2B:
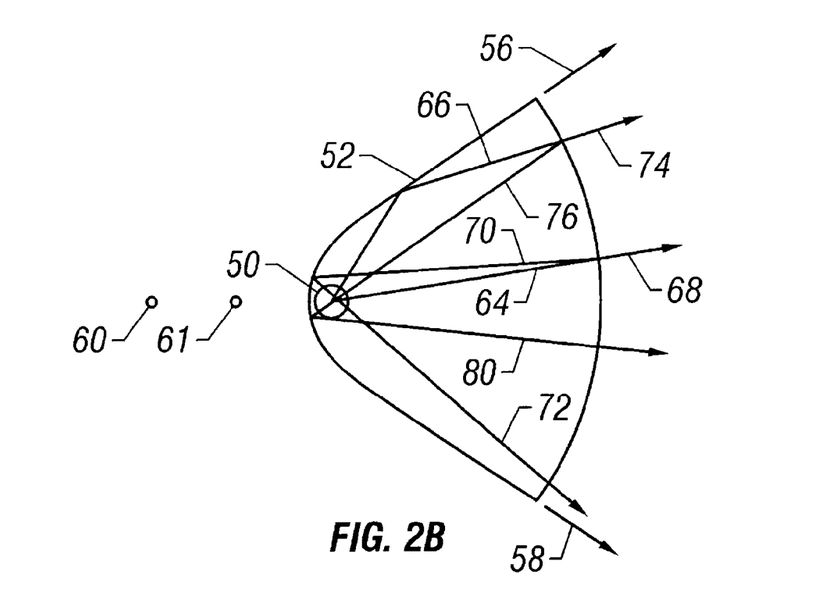
FIG. 2B is a cross-section diagram of the flash unit illustrating the paths of light rays, including reflected light rays, passing through the polarizer.

FIG. 2a shows a perspective drawing of a flash unit 40 consisting of a flashlamp 50, reflectors 52 and 62 and a reflective sheet circular polarizer 54 which transmits right circularly polarized light and reflects left circularly polarized light. FIG. 2b is a cross-section of this flash unit in a plane perpendicular to the axis of the flashlamp tube. A typical flashlamp is a tube ⅛ inch in diameter in which the flash originates from a portion of the center of the tube, about ½ inch in length. The principal reflector is a deeply curved reflector 52 which is an initially flat sheet of shiny metal curved around the back of the flash tube and shaped to reflect light from the tube in the forward direction. The angular range of illumination of the photographic scene is determined by the depth of the reflector, limiting the directions of light emerging directly from the flashlamp, light rays 56 and 58 in FIG. 2b, and by the shape of the reflector, which normally directs light into a narrower angular range than the light emerging directly from the flashlamp. For instance, if the curve of the principal reflector 52 has the shape of a hyperbola, with the center of the flashlamp tube 50 at one focus of the hyperbola as shown in FIG. 2b, then the reflected light appears to originate from a virtual source at the other focal point of the hyperbola, indicated as point 60 in FIG. 2b. At the ends of this hyperbolic cylindrical principal reflector are typically flat secondary reflecting planes 62 that also direct light forward toward the photographic scene. This combination of flashlamp and reflectors is designed to direct the majority of the light from the flashlamp forward so that it effectively illuminates the photographic scene.

To convert this flash unit into a circularly polarized light-generating flash unit, a reflective sheet circular polarizer is added in such a way that it maintains to a large extent the angular distribution of light that the flash unit was originally designed to produce. For example, it does not direct a significant amount of light outside the angular range for which the flash unit was designed. For purposes of illustration we assume that this polarizer transmits right circularly polarized light and reflects left circularly polarized light. As shown in FIG. 2a and FIG. 2b, the originally flat sheet polarizer is mounted on the front of the flash unit and curved so that its curve is an arc of an ellipse with its foci at the positions of the foci of the hyperbolic principal reflector. As an approximation to this ellipse, the polarizer can be curved into the arc of a circle with the center of the circle shown as point 61 half way between the foci of the hyperbolic principal reflector 52 in FIG. 2b. Even for a principal reflector which is deeply curved but not a hyperbola, there will be an optimum curvature for the polarizing filter that will result in redirecting a majority of the recycled light toward the photographic scene. This optimum curvature can be found by calculations, numerical simulations, or empirical trials whose methods are known to those skilled in the art.

Following the rays of light emitted from the flash lamp, there are several light paths possible, one starting with ray 64 in FIG. 2b, which strikes the polarizer directly, and one starting with ray 66 in FIG. 2b which strikes the reflector directly and then the polarizer. The unpolarized light ray 64 is separated into ray 68, emerging from the flash unit as right circularly polarized light, and light ray 70 which is left circularly polarized and is reflected back toward point 60. Ray 70 is reflected from the reflector, passing through the flashlamp, becoming ray 72 which is right circularly polarized, due to specular reflection. Ray 72 is transmitted by the polarizer, and travels forward, from a virtual source at the position of the flashlamp. Now consider a light ray such as ray 66 in FIG. 2b, which strikes the polarizer and is separated into ray 74 which is transmitted by the polarizer and emerges as right circularly polarized light, and left circular polarized ray 76 which is reflected back through the flash lamp. Ray 76 is reflected from the surface of the reflector, becoming right circularly polarized ray 80 which is transmitted by the polarizer. Ray 80 appears to come from virtual source point 60. Other rays of light similar to ray 64 that strike the polarizer directly may be recycled twice before they leave the flash unit, but they too appear to come from virtual point source 60.

Rays of light traveling not in the plane of the drawing 2b, but obliquely to that plane, have projections of their paths on the plane of drawing 2b, similar to the typical paths shown in the drawing, and they also emerge from the flash unit in the desired angular range for illuminating the photographic scene. Thus essentially all light reflected from the reflective polarizer following paths, or projections of paths, such as those of rays 70 or 76 is effectively recycled and emerges from the flash unit in the desired angular range of illumination for which the flash unit was designed. The light rays and paths described here are approximate, since the flashlamp is not a perfect line source of light exactly at the focus of the hyperbola, and since many of the recycled rays pass through the flash lamp, and may be reflected or refracted by the glass of the flash lamp, changing their paths. These are second order changes in the overall functioning of the system of reflectors and polarizer, and still result in the substantial portion of light emerging in the desired angular range for illuminating the photographic scene.

With this polarized flash unit, the polarizing filter over the camera lens is a right circular polarizer, to match the polarization sense of the polarizer over the flash unit. Equally effective, both circular polarizers over the flash unit and the camera lens could be left circular polarizers.

EXAMPLE 2

In this example, the light recycling within the flash unit is achieved by use of a first reflective linear sheet polarizer and a quarter wave plate over the flash unit. The optical axis of the quarter wave plate is oriented at approximately a 45 degree rotation angle with respect to the polarization axis of the linear polarizer. A second reflective linear sheet polarizer is placed over the camera lens, with its polarization axis oriented at a 90 degree angle with respect to the polarization axis of the polarizer in the flash unit. As in Example 1, this design is illustrative of conversion of an existing flash unit design to one that produces polarized light.

FIG. 3 shows a side sectional view of a flash unit 90 similar in design to that shown in FIG. 2, with a deeply curved principal reflector and a curved combination of a linear reflective polarizer 100 and a quarter wave optical retarder film 102, which is positioned between the polarizer and the flash lamp. This combination of polarizer and retarder film is curved in the same manner as the circular polarizer shown in FIG. 2. Light reflected by the sheet polarizer 100, transmitted through the quarter wave retarder film 102, and recycled within the flash unit is circularly polarized as it propagates and is reflected within the flash unit. For the purposes of analyzing the light recycling and redirection, different rays of light travel along paths and change their polarizations just as the light rays do in FIG. 2. However, the light emerging from the flash unit and transmitted by the linear polarizer is linearly polarized. In adding the reflective linear polarizer to a flash unit it may not be necessary to include the use of a quarter wave optical retarder film, because the flash unit may already contain a lens or window positioned between the flash lamp and the most desirable position of the polarizing filter. This lens or window can serve to change the polarization state or depolarize the light passing through it, making the use of the quarter wave retarder film unnecessary. When the unpolarized or partially polarized light within the flash unit is incident again on the reflective polarizer, some portion of it is transmitted, while the rest is reflected and recycled again. In that case, the light recycling process may involve several reflections of a portion of the light off the polarizer and the reflector before most of the light is transmitted by the polarizer. For this design to be effective, the reflector and other elements in the flash unit should absorb very little light, since several internal reflections can occur.

EXAMPLE 3

This example illustrates the design of a new polarized light flash unit, rather than modification of an existing flash unit, combining optical elements as needed with the objective of directing all the light from the flash unit toward the scene to be photographed. It is only one example of many possible designs using a variety of optical elements to achieve the same desired objective.

For reasons of simplicity or convenience it may be desirable to design a relatively flat flash unit with a flat reflective polarizer, and with a shallowly curved reflector for directing light toward the photographic scene. Especially with the light recycling feature of the reflective sheet polarizers, such a flat flash unit typically produces a very widely directed angular distribution of light. To redirect this light toward the photographic scene, one can incorporate the use of prismatically surfaced brightness enhancing films (such as those sold by the 3M Company (St. Paul. Minn.) under the product name of BEF II) in the flash unit. FIG. 4 shows a simple flash unit 110 with a shallow reflector 120 and a flat reflective polarizer 122. Positioned between the reflective polarizer 122 and the flash lamp 50 are two prismatically surfaced brightness enhancing films 123 and 124, with their prismatic surfaces oriented toward the reflective polarizer 122 and their prismatic surface groove directions oriented at right angles to one another. The prismatic surfaces of the brightness enhancing films redirect some light forward and other light back into the light source, with the overall effect that broadly directed light within the light source is redirected forward, generally in a direction perpendicular to the film plane, that is, toward the photographic scene. The brightness enhancing films also act to depolarize light passing through them within the flash unit, so that the recycled light may undergo several reflections before emerging from the flash unit. For this design to be effective, the reflector 120 should absorb very little light, since several internal reflections can occur. In this example, either circular or linear reflective polarizers can be used, with the appropriate polarizing filter (see above) over the camera lens to block glare.

All patents and publications mentioned in the specification are indicative of the levels of skill of those skilled in the art to which the invention pertains. All references cited in this disclosure are incorporated by reference to the same extent as if each reference had been incorporated by reference in its entirety individually.

One skilled in the art would readily appreciate that the present invention is well adapted to carry out the objects and obtain the ends and advantages mentioned, as well as those inherent therein. The specific methods and constructs described herein as presently representative of preferred embodiments are exemplary and are not intended as limitations on the scope of the invention. Changes therein and other uses will occur to those skilled in the art which are encompassed within the spirit of the invention are defined by the scope of the claims.

It will be readily apparent to one skilled in the art that varying substitutions and modifications may be made to the invention disclosed herein without departing from the scope and spirit of the invention. While the description and examples above exemplify embodiments of the present invention, those skilled in the art will recognize that the photographic glare reduction system may be provided in a variety of configurations, such as with different selections of polarizing filters and arrangements of the elements of the system. Such variations are within the scope of this invention.

The invention illustratively described herein suitably may be practiced in the absence of any element or elements, limitation or limitations which is not specifically disclosed herein. Thus, for example, in each instance herein any of the terms "comprising," "consisting essentially of" and "consisting of" may be replaced with either of the other two terms. The terms and expressions which have been employed are used as terms of description and not of limitation, and there is not intention that in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

In addition, where features or aspects of the invention are described in terms of Markush groups or other grouping of alternatives, those skilled in the art will recognize that the invention is also thereby described in terms of any individual member or subgroup of members of the Markush group or other group.

Thus, additional embodiments are within the scope of the invention and within the following claims.

What is claimed is:

1. A flash camera with glare controlling ability for general photographic use, wherein said camera comprises at least two panchromatic reflective polarizing sheet filters, wherein a first polarizing filter is configured and arranged as a component within a flash source portion of said camera, to provide greater transmission of polarized light toward the photographic scene than that provided by direct transmission through said reflective sheet polarizing filter, and a second said polarizing filter is configured and arranged to cover a separate lens portion of said camera.

2. The flash camera of claim 1, wherein the design of said flash source portion is selected from the group consisting of:

a deeply curved reflector and curved polarizer, and a shallowly curved reflector, flat polarizer, and prismatically surfaced brightness enhancing films.

3. The flash camera of claim 1, wherein at least said second filter, covering said lens portion, can be removed or displaced from said lens portion to allow more ambient light to enter said camera.

4. The flash camera of claim 3, wherein said second filter can be displaced by sliding or hinging it away from said lens portion of said camera.

5. The flash camera of claim 1, wherein said first polarizing filter as part of said flash source portion and said second polarizing filter covering said lens portion of said camera are panchromatic reflective sheet circular polarizing filters having the same sense of circular polarity.

6. The flash camera of claim 1, wherein said first polarizing filter as part of said flash source portion and said second polarizing filter covering said lens portion of said camera are panchromatic reflective sheet linear polarizing filters with their polarization axes oriented perpendicular to each other.

7. The flash camera of claim 6, wherein a portion of quarter wave optical retarder sheet material is oriented with its optical axis at approximately 45 degrees angular rotation with respect to the polarization axis of said first filter, and is configured and arranged beneath said first polarizing filter within said flash source portion of said camera.

8. The camera of claim 1 in which the recording means for a photographed image is selected from the group consisting of:

a film emulsion, and a recording electronic imaging device such as is found in a digital recording camera.

9. The flash camera of claim 1, wherein a majority of the light generated within said flash source portion is transmitted through said first reflective sheet polarizing filter and out of said flash source portion as polarized light.

10. The flash camera of claim 1, wherein at least 75% of the light generated within said flash source portion is transmitted through said first reflective sheet polarizing filter and out of said flash source portion as polarized light.

11. The flash camera of claim 1, wherein light recycling within said flash source portion increases the light transmission from said flash source portion at least 60% over light transmission without recycling.

12. A method of reducing reflected glare from a photographic scene illuminated by a flash source portion of a flash camera comprising the steps of:

providing at least two panchromatic reflective sheet polarizing filters, structuring said camera with a first polarizing filter as a component within said flash source portion of said camera, wherein said polarizing filter is configured and arranged to provide greater transmission of polarized light toward said photographic scene than is provided by direct transmission through said polarizing filter, and a second filter covering a lens portion of said camera, and executing a photograph with said camera during flash-illumination of said photographic scene.

13. The method of claim 12 wherein the configuration and arrangement of said first polarizing filter within said flash source portion of said camera is selected from the group consisting of:

a deeply curved reflector and curved reflective polarizer, and a shallowly curved reflector, flat reflective polarizer, and prismatically surfaced brightness enhancing films.

14. The method of claim 12, wherein said polarizing filters are panchromatic reflective sheet circular polarizing filters having the same sense of circular polarity.

15. The method of claim 12, wherein said polarizing filters are panchromatic reflective sheet linear polarizing filters with their polarization axes oriented perpendicular to each other.

16. The method of claim 15, wherein a portion of quarter wave optical retarder sheet material is oriented with its optical axis at approximately 45 degrees angular rotation with respect to the polarization axis of said first filter, and is configured and arranged beneath said first filter within said flash source portion of said camera.

17. The method of claim 12, wherein a majority of the light generated within said flash source portion is transmitted through said first reflective sheet polarizing filter and out of said flash source portion as polarized light.

18. The method of claim 12, wherein at least 75% of the light generated within said flash source portion is transmitted through said first reflective sheet polarizing filter and out of said flash source portion as polarized light.

19. The method of claim 12, wherein light recycling within said flash source portion increases the light transmission from said flash source portion at least 60% over light transmission without recycling.

* * * * *